Inventor
ANDRÉ MINGAUD
By [signature]
Attorney

Inventor
ANDRÉ MINGAUD
By [signature]
Attorney

United States Patent Office 3,303,352

Patented Feb. 7, 1967

3,303,352
BLOCKING OSCILLATOR WITH TURN-OFF EFFECTED BY MAGNETIZING CURRENT IN A SELF-INDUCTANCE COIL

André Mingaud, Ivry, France, assignor to International Standard Electric, New York, N.Y., a corporation of Delaware Filed Feb. 8, 1963, Ser. No. 257,163
Claims priority, application France, Feb. 23, 1962, 888,966
5 Claims. (Cl. 307—88.5)

The present invention relates to a blocking oscillator, that is to say, a device which, under control of a starting impulse, will generate an impulse of a given amplitude and of given time duration; as soon as this latter impulse ends, the oscillator stops and can no longer start over again except through a control of a new starting impulse. Such oscillators are of current use in electronic switching; they are being used, in particular, to determine the exact instant wherein an item of information is to be written or read on a magnetic memory. The invention proposes itself to realize with a minimum amount of simple elements an oscillator of such a type, of internal low impedance, which generates impulses strictly calibrated, the duration of which depends neither upon the power supply nor upon the load.

A feature of the present invention is the utilisation of a normally blocked amplifier, and the applying of a starting impulse onto the input circuit so as to unblock the said amplifier, the whole or part of the outgoing signal being transferred onto the input so that the amplifier once started into operation reaches rapidly saturation; to the incoming signal is opposed a second signal which grows higher according to a given law, and, when the level of the resulting signal lowers under a certain threshold, the amplifier will stop from operating, this starting and stopping of operating is used for obtaining the front edge and back leading edge of the outgoing impulse.

According to another feature of the invention, a transistor is used as amplifier and the whole or part of the emitter current is transferred onto the base through a first fraction of a self inductance winding, a current being made to derive through the second fraction of the said winding, so that the resulting ampere-turns be null at any instant, thus the transistor will saturate in practically instantaneous manner, the outgoing impulse being taken between the emitter and the base of the transistor.

According to another feature of the invention, when the transistor reaches saturation, the constant voltage at both ends of the self inductance gives rise to a magnetizing current which opposes itself to the base current and increases according to a linear law, so that, when the resulting current lowers down below a certain threshold, the transistor blocks—and that brings to an end the outgoing impulse.

According to another feature of the invention, the self-inductance is so determined that the ampere-turns created in the second fraction of the winding would never cause the saturation, this self-inductance keeping a constant value during the entire duration of the outgoing impulse, thus making it possible to obtain a strictly calibrated impulse.

According to another feature of the invention, the self-inductance is realized by means of two portions of a magnetic circuit separated by a gap the size of which would be two limits $e1$ and $e2$, the lower limit $e1$ being determined in such way as to prevent the saturation, the higher limit $e2$ being determined in such way as to obtain a satisfactory coupling between the two halves of the winding.

According to another feature of the invention, the winding of the self-inductance is divided into two equal fractions, so as to obtain for this self-inductance a minimum space requirement for a given duration of the outgoing impulse.

According to a variant another feature of the invention is to have the winding of the self-inductance divided into two unequal fractions and to foresee an inferior number of turns for the fraction connected to the base so as to increase the power obtained from the load resistor.

Other objects and features of the invention will become apparent when the following specification, given by way of nonlimitative example, is read in conjunction with the drawings comprising FIGS. 1 to 5 as follows.

Figure 1:
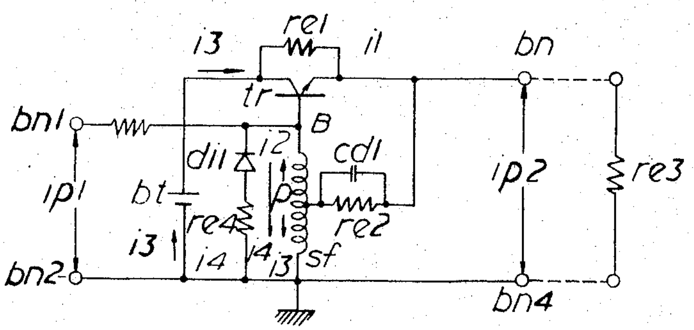
FIG. 1 shows the blocking oscillator realized according to the principles of the present invention.

*General operating process of the blocking oscillator (FIGS. 1 and 2).*—The oscillator comprises two input terminals *bn1*, *bn2* and two output terminals *bn3*, *bn4*. The terminals *bn2* and *bn4* are connected to earth, taken as reference potential. At the instant *t0*, no impulse *ip1* is applied to the input terminals *bn1*, *bn2*, as is indicated on the drawing of FIG. 2; the base of the transistor *tr* is then connected to earth through the self-inductance coil *sf*. Its collector is connected to the positive pole of the current supply battery *bt*. A positive potential of some fractions of voltage, upon the emitter, supplied by the voltage divider *re1*, *re2* ensures the blocking of the transistor; this potential is determined in such manner as to limit the rest current, to an acceptable value and to prevent any operating under influence of noise or parasitics. In such condition no impulse *ip2* is gathered at the output terminals *bn3*, *bn4*, the terminal *bn3* being very near to ground potential.

Figure 2:
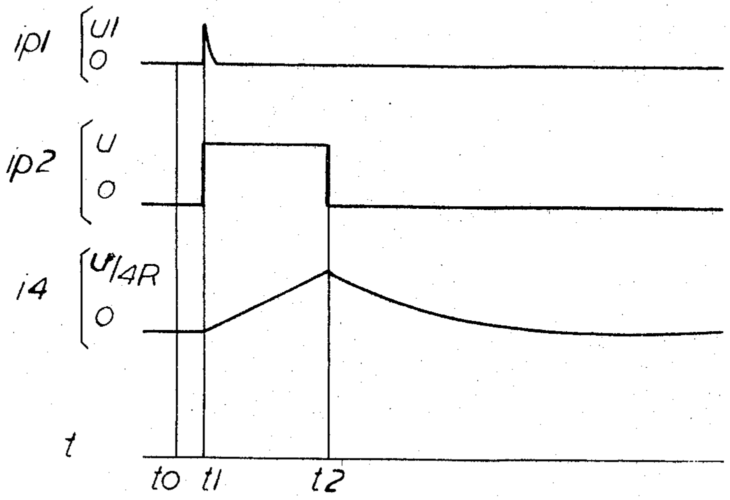
FIG. 2 is a time chart enabling to explain the operating of the oscillator in FIG. 1.

At the instant *t1*, a starting impulse *ip1*, of amplitude U1, is applied to the input terminal *bn1*, as is indicated in FIG. 2, and this impulse starts rendering the transistor conductive. Due to this fact, a certain current *i1* appears in the circuit of the emitter. As shown by the arrow, the conventional direction has been chosen as positive direction. This current flows through the resistor *re2*, and will end up upon point P in the self-inductance *sf*.

First will be explained the simplest case, that is to say, the case where point P coincides with the middle point of the self-inductance. A part *i3* of the current *i1* flows through the lower portion 1 of the self-inductance, the feeding battery *bt* and the collector circuit. The coil of the self-inductance *sf* may be considered as a transformer, the primary of which is made up by the lower portion 1 of the coil, and the secondary by the upper portion 2 of the coil; in such condition, a current *i2* starts in the upper portion 2 of the coil *sf* as indicated by the arrow, and flows onto the base of the transistor. The ampere turns created by the current *i2* are equal and of opposite direction to the ampere turns created by *i3*; and since the self-inductance is divided into two equal parts by the point P, $i2=i3$. No current being able to accumulate at the point P, the equality obtained being:

$$i1=i2+i3$$

There is indeed found, upon the emitter, the current *i1* corresponding to the sum of base current *i2* and collector current *i3*. The presence of base current *i2* brings about an increase in the emitter current $i1$, which in its turn brings about a new increase in the base current and so on. The transistor *tr* saturates therefore very rapidly. The condenser *cd*1 has been provided to accelerate the phenomenon. Practically speaking, this time lapse of saturation is of about a few tenths of microseconds with transistors of the currently used type, and it may even be much less with rapid transistors. In order to simplify the drawing of FIG. 2, it has been assumed that this time lapse is negligible.

When the transistor is saturated, its three electrodes are, pretty near, at the same potential +U, designating by U the voltage of the current supply battery. There is gathered, therefore, on the output terminals *bn*3, *bn*4, a positive impulse of amplitude U (curve *ip*2 instant *t*1). The middle point of the self-inductance *sf* being at the $+U/2$ potential, a difference of potential $U/2$ is being applied to the ends of the resistor *re*2. If value of the latter is designated by R, the current $i1$ is equal to $U/2R$, each of the two currents $i2$ and $i3$ being equal to $U/4R$.

The self-inductance *sf* being submitted to a constant voltage U, a magnetizing current $i4$ begins to flow as indicated by the arrow. At the instant *t*1, this current is null, then it increases in linear manner according to time (FIG. 2) when assuming that the self-inductance keeps a constant value, that is to say, is not saturated. In designating by L the value of this self-inductance and by $t$ the time counted as from the instant *t*1, the value of the magnetizing current $i4$ is given by the formula:

$$i4=\frac{U}{T}t$$

The currents $i2$ and $i4$ being of opposite directions, the base current diminishes and will tend toward 0.

When the value of the base current decreases below a certain threshold, the transistor *tr* ceases to be saturated. Due to this fact, the emitter current $i1$ diminishes, and that brings about a new decreasing of the base current; the emitter current diminishes anew, and the transistor blocks rapidly. The time duration of this blocking is of the same order as the one of the saturation; in the drawing of FIG. 2 it was assumed that this duration is negligible. The transistor being blocked, the emitter passes onto a potential neighbouring earth potential and the impulse *ip*2 comes to an end (curve *ip*2 instant *t*2).

It is possible to assume, at first approximation, that the calibrated impulse *ip*2 comes to an end at the moment wherein the currents $i2$ and $i4$ are equal. In designating by T the duration of this $i$ impulse, one can therefore write:

$$\frac{U}{4R}=\frac{U}{L}T$$

$$T=\frac{L}{4R} \qquad (1)$$

When loading of oscillator is being made on a load resistance *re*3 by effecting the connections shown in dotted line on the drawing, nothing is changed in the operating. The current flowing in this resistance closes through the feeding battery *bt* and the collector circuit, by superposing itself to current $i3$. The currents flowing in the resistor *re*2, and in the two parts of the self-inductance *sf* remain unchanged.

It is seen therefore that, practically speaking, there is no need to seek for too high results if it is required to obtain swift flanks for the outgoing impulse. A satisfactory operating is still obtained by choosing equal values for the resistors *re*2 and *re*3. The voltages at the ends of these two resistors being, respectively, $U/2$ and U; and the dissipated powers being proportional to the squares of these voltages, the dissipated power in the resistor *re*2 is only a quarter of the useful power. The result is therefore of 80%.

It results from the Formula 1 that the duration of the generated impulse does not depend either on the supply voltage or on the requested power. It is also seen that the internal impedance of this generator is very low during the time duration of the impulse, since it corresponds to the emitter-collector resistance of a saturated transistor. The starting impulse may be very short and its amplitude relatively low, since there is cumulative effect as soon as the emitter current starts appearing.

When the transistor is blocked, everything will take place as if there was a cutting at the higher extremity B of the self-inductance. There appears therefore at that point a negative overvoltage liable to damage the transistor. To prevent such a drawback, this overvoltage can be absorbed by means of a circuit made up of a diode *di*1 and a resistor *re*4 sufficiently low, in which the energy, stored in the self-inductance, will dissipate in the form of an exponentially decreasing current.

Figure 3:
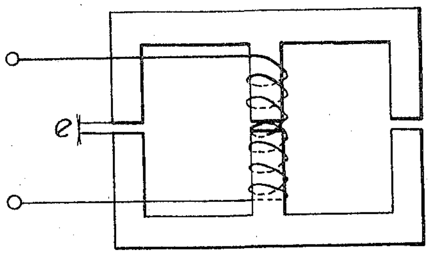
FIG. 3 shows a simplified illustration of the self-inductance winding used in the oscillator of FIG. 1.

*Determining the self-inductance coil.*—The operating process described above assumes that the value of the self-inductance remains constant during the entire duration of the outgoing impulse. This self-inductance may be realized, for instance, by means of two magnetic circuit portions, in E, as indicated on the drawing of FIG. 3, separated or not separated by a gap $e$. For each gap value, the manufacturer mentions a coefficient $k$, which corresponds to a number of microhenrys per turn as well as the ampere turns A, not to be overdone if it is not required to saturate the self-inductance. The product $k$A is therefore deduced, and will be used for the subsequent calculations. As an example, if a closed ferrite pot, of the type FXC–3B–14/8, is used, the following table is obtained:

| e | k | A | kA |
|---|---|---|---|
| 0 | 1 | 1 | 1 |
| 0.1 | 0.14 | 20 | 2.8 |
| 0.2 | 0.09 | 40 | 3.6 |

The problem consists in choosing one of these gaps in such a way that A, and consequently $k$A, does not exceed values beyond which there would be saturation. The maximum current in the lower portion of the self-inductance, at the end of impulse, is given by the expression:

$$Im=\frac{U}{L}T+\frac{U}{4R}=\frac{U}{L}T+\frac{U}{L}T=\frac{2UT}{L}$$

In designating by N the total number of turns of the self-inductance, the following is obtained for the corresponding ampere turns:

$$A=\frac{N}{2}\times\frac{2UT}{L}=\frac{NUT}{L}=\frac{NUT}{kN^2}=\frac{UT}{kN}$$

from which is deduced $$kA=\frac{UT}{N} \qquad (2)$$

Knowing the required duration T for the calibrated imulse and the resistance R, the value of the self-inductance L is calculated by means of Formula 1. First, a choice is made of a gap, the smallest possible (0 in the example described here), and the number of turns is calculated by means of formula $L=kN^2$. It is then possible, by means of Formula 2, to calculate the product $k$A and it is checked that this product does not exceed the one indicated in the table. In the contrary case, the immediately higher gap value is chosen and the same calculations are started over again. Thus, among the possible solutions, the one is taken which corresponds to the minimum gap, that is to say, to the minimum number of turns for improving the coupling between the two parts of the winding.

A numerical example will illustrate the above. There will be assumed that it is required to obtain an impulse of 8 microseconds under 10 volts with a value R equal to 100 ohms.

Thus will be obtained, by means of Formula 1, the following:

$$L=4RT=4\times100\times8\times10^{-6}=3.2\times10^{-3}\text{ henrys}$$
$$=3200\text{ microhenrys}$$

By applying the formula $L=kN^2$ and by choosing first the gap 0, the following is obtained:

$$N=\sqrt{\frac{3200}{1}}=57\text{ turns}$$

By applying the Formula 2, the following is obtained:

$$kA=\frac{UT}{N}=\frac{10\times8}{57}=1.4$$

This value is higher than the one indicated in the table for a null gap. The same calculation will therefore be started over again by choosing the next gap 0.1. There is obtained, for the number of turns N:

$$N=\sqrt{\frac{3200}{0.14}}=150\text{ turns}$$

$$kA=\frac{UT}{N}=\frac{10\times8}{150}=0.53$$

This value, being clearly inferior to the limit 2.8 indicated in the table, it is possible to adopt the gap 0.1.

Figure 4:
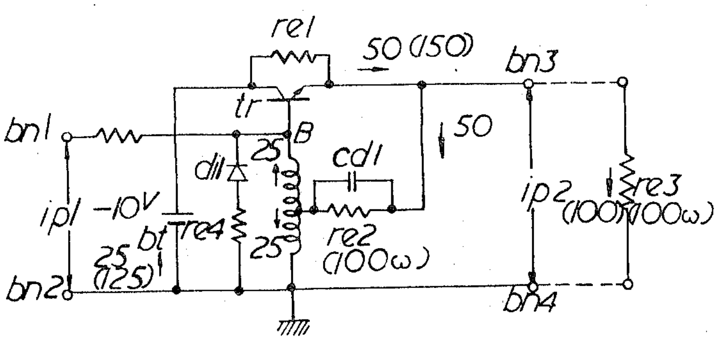
FIG. 4 is an example for realizing the oscillator of FIG. 1, together with a certain number of voltage numerical values of the current intensity and of the resistances.

In FIG. 4, there has been mentioned, in milliamperes, the current intensities which corresponds to the preceding numerical example. In front of some of the arrows, two values are found; the first one corresponds to the case wherein there is no loading; the second one, in brackets, corresponds to the case wherein loading of oscillator is upon a 100 ohms resistor.

Figure 5:
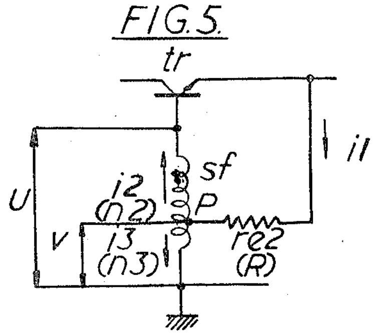
FIG. 5 is a variant of the oscillator, in FIG. 1.

*Case of a self-inductance with whatever branching point.*—Now will be described, by referring to FIG. 5, the case wherein the self-inductance $sf$ is divided up in two unequal parts by the point P. If the number of turns of the upper winding and of the lower winding are designated by $n2$ and $n3$ respectively, the currents $i2$ and $i3$ are such as to have the resulting ampere turns be null:

$$n2\times i2=n3\times i3 \qquad (3)$$

During the time-duration of the outgoing impulse, the potential of point P is given by the following expression:

$$v=U\times\frac{n3}{n2+n3}$$

If the value of the resistor $re2$ is designated by R, there is obtained:

$$i2+i3=i1=\frac{U-v}{R}=\frac{U}{R}-\frac{V}{R}$$

$$i2+i3=\frac{U}{R}-\frac{U}{R}\times\frac{n3}{n2+n3}$$

$$i2+i3=\frac{U}{R}\times\frac{n2}{n2+n3} \qquad (4)$$

By eliminating $i3$ between the Equations 3 and 4, there is finally obtained $$i2=\frac{UU}{R}\times\frac{n2\times n3}{(n2+n3)^2} \qquad (5)$$

The outgoing impulse comes to an end when the magnetizing current $i4$ balances the base current $i2$.

$$\frac{U}{L}T=\frac{U}{R}\times\frac{n2\times n3}{(n2+n3)^2}$$

from which is obtained:

$$T=\frac{L}{R}\times\frac{n2\times n3}{(n2\times n3)^2} \qquad (6)$$

As in the case of a self-inductance with middle point, the time duration of the outgoing impulse is independent of the supply voltage. For a constant total number of spires, this time duration is maximum for $n2\times n3$ and equal to $L/4R$. When a definite time duration is fixed, it is advisable, therefore, to choose a self-inductance with middle point, so as to acquire a minimum space requirement. On the other hand, if a higher power is required in the load resistance, it is preferable to displace the branching point P towards the top. In fact, during the time duration of the outgoing impulse, the transistor is saturated, that is to say that the emitter current with respect to base current remains inferior to a certain limit (amplifying coefficient). By displacing the branching point P towards the top, $n2$ is reduced, therefore $i2$ is increased; it is thus possible, while still keeping the saturation condition of the transistor, to increase the emitter current and, subsequently, the dissipated power in the load resistance.

It is understood the foregoing descriptions have been given only as a way of example, nonlimitative, and that many other embodiments are liable to be carried out without leaving the scope of the invention. The transistor npn could be replaced by a transistor pnp, or by another element filling the same functions, such as an amplifier with tubes; also to substitute the self-inductance, having magnetizing current increasing in linear manner, with a delaying device based, for instance, on the charge or discharge of a condenser. In particular, all the various numerical indications in the above specification were just given as example to facilitate the understanding of the operating process and they may vary with every installation.

While I have described above my invention with respect to specific apparatus, it is not intended to limit the scope thereof other than with respect to the claims contained herein.

I claim:

1. A blocking oscillator of the triggered type for generating an impulse of a predetermined amplitude and duration upon actuation by a starting impulse including:
   - a transistor;
   - means to block said transistor including a voltage divider comprising a first resistor coupled between the collector and emitter of said transistor and a second resistor coupled between said emitter and the base circuit of said transistor;
   - input circuit means for applying a starting impulse to said base of said transistor to unblock said transistor;
   - a positive feed-back circuit coupling the emitter output current of said transistor to said base to rapidly effect saturation current flow in said transistor including said second resistor;
   - a self-inductance winding; and
   - means coupling said winding to said input and at least part of said winding to said feed-back circuit, to generate in said winding linearly increasing current upon the commencement of said saturation current flow, and opposed to said fed-back emitter output current to cause said transistor to become blocked again upon the resultant of said fed-back emitter output current and said linearly increasing current in said part of said winding falling below a predetermined threshold.

2. A blocking oscillator of the triggered type for generating a pulse of a predetermined amplitude and duration upon actuation by a starting impulse including:
   - a blocked amplifier;
   - input circuit means for applying a starting impulse to said amplifier to unblock said amplifier;
   - a self-inductance winding;
   - means including a positive feed-back circuit and a part of said self-inductance winding coupling the output of said amplifier to the input of said amplifier and being responsive to said starting impulse for rapidly effecting saturation current flow in said amplifier for initiating said predetermined duration; and
   - means including said self-inductance winding coupled in the input circuit of said amplifier to block said amplifier upon the termination of said predetermined duration.

3. A blocking oscillator according to claim 2 wherein said means coupling said self-inductance winding in said amplifying circuit generates in said winding linearly increasing current upon the commencement of said saturation current flow and opposed to the fed-back output current in said part of said winding to cause said amplifier to become blocked upon the resultant of said fed-back output current and said linearly increasing current in said part of said winding falling below a predetermined threshold.

4. A blocking oscillator according to claim 3 wherein said self-inductance winding is always operated below its saturation current.

5. A blocking oscillator according to claim 3 wherein said predetermined threshold is determined by said predetermined duration.

References Cited by the Examiner

UNITED STATES PATENTS

| | | | |
|---|---|---|---|
| 2,997,600 | 8/1961 | Hilberg et al. | 307—88.5 |
| 3,002,110 | 9/1961 | Hamilton | 307—88.5 |
| 3,056,930 | 10/1962 | Berg | 331—112 X |
| 3,059,141 | 10/1962 | Fischman | 331—112 X |
| 3,070,756 | 12/1962 | Fischman | 331—112 X |
| 3,072,802 | 1/1963 | Myers et al. | 307—88.5 |
| 3,155,843 | 11/1964 | Levinson | 331—112 X |
| 3,156,876 | 11/1964 | Fischman et al. | 331—112 |

ARTHUR GAUSS, *Primary Examiner.*

J. JORDAN, *Assistant Examiner.*